United States Patent [19]
Walt

[11] 3,920,226
[45] Nov. 18, 1975

[54] COMBINATION FROZEN JUICE REMOVER, MIXER AND CONTAINER

[76] Inventor: Robert Alan Walt, 1445 Fern Ave., Duluth, Minn. 55805

[22] Filed: June 13, 1974

[21] Appl. No.: 478,894

[52] U.S. Cl. ............... 259/72; 206/219; 220/1 E
[51] Int. Cl.² ......................................... B01F 11/00
[58] Field of Search ...... 259/4, 72, 18, 19, DIG. 23, 259/DIG. 25, DIG. 29, DIG. 30, 36, 37, 60, 61, 54, 72, 75, 76, 80, 82; 206/219; 220/1 E

[56] References Cited
UNITED STATES PATENTS

| 395,303 | 12/1888 | Wuchner | 259/72 |
| 653,233 | 7/1900 | Godward | 259/DIG. 23 |
| 1,060,419 | 4/1913 | Benjamin | 259/DIG. 23 |
| 2,592,485 | 4/1952 | Stair | 259/72 |
| 2,601,018 | 6/1952 | Heyl | 259/4 |
| 3,136,532 | 6/1964 | Rudnick | 259/72 |

Primary Examiner—Robert W. Jenkins
Attorney, Agent, or Firm—Wicks & Nemer

[57] ABSTRACT

A device for removing frozen juice from a container and mixing the same with a liquid in a receptacle including a receptacle having a bottom with a rigid rectangular shaped blade having a helical twist and secured to the bottom of the receptacle.

2 Claims, 3 Drawing Figures

COMBINATION FROZEN JUICE REMOVER, MIXER AND CONTAINER

SUMMARY

The invention relates to a device for removal of frozen juice from a container in frozen plug form and more particularly to a device including a receptacle having a blade which is rectangular in outline and with a helical twist. The blade is securely mounted in the bottom of the receptacle extending axially and upwardly from the bottom. A container of frozen juice is forced upon the blade by following the helix of the blade until the blade bottoms out in the can. The can is given a further and partial rotation whereby the top end of the blade wipes the bottom of the can to free the juice plug from the bottom of the can. The can is then pulled from the frozen juice plug impaled on the blade by pulling on the can with a further twisting motion in the same rotative direction. This leaves the frozen juice in the form of a plug impaled on the blade.

Water is then added to the receptacle and the receptacle closed and shaken whereby the frozen juice is melted and mixed with the water. The invention obviates the necessity of digging the frozen juice from the container or causing it to melt by running hot water over the container or leaving the frozen juice subject to room temperature. The blade also aids in the mixing of the frozen juice with the water when the receptacle is shaken thus doing away with the need for any additional type of mixing device. The cost of the device is only very slightly more than the cost of the container.

In the drawings forming part of this application:

Figure 1:
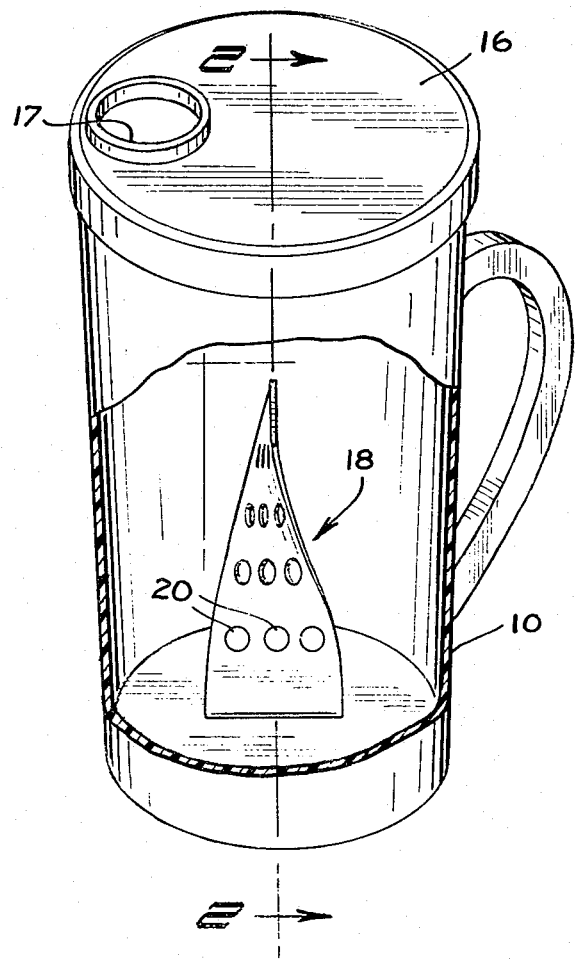
FIG. 1 is a perspective view of a receptacle having a blade member embodying the invention, a portion of the receptacle being broken away.

Referring to the drawings in detail, the combination frozen juice remover and container-mixer A includes the receptacle 10 which includes the bottom 12. The wall 14 of the receptacle is circular in cross-section but may be any polygonal formation. The receptacle is provided with the removable close fitting top 15 which may have the spout 17.

Further provided is the rigid blade 18 which in died-out flat formation is rectangular in outline with the width thereof substantially the diameter of the can C desired to be emptied of its frozen contents. However, the frozen contents of a container having a diameter larger than the width of the blade may be removed as herein disclosed. The blade has the squared off end 19.

The blade 18 is formed with a helical twist with a pitch of 90° as shown; however the degree of twist may be substantially between 45° and 90°. The axis of the blade is coincidental with the longitudinal axis of the container and the upper edge of the blade parallel to the bottom 12. The blade is also formed with the holes 20 which aid in the mixing action of the frozen juice with a liquid such as water.

OPERATION

In using the device let it be assumed that it is desired to remove frozen orange juice concentrate or the like from a container. The receptacle 10 is held firmly with the open end of the juice can C pointed toward the blade and held firmly. The can is then pushed upon the blade with the blade entering the frozen juice. The can is further pushed so that the blade is forced into the frozen juice, and as the blade is so forced, the can is rotated to allow the blade to enter the juice in a twisting action, the twisting motion following the pitch of the blade. As a result the frozen juice is impaled on the blade.

Figure 2:
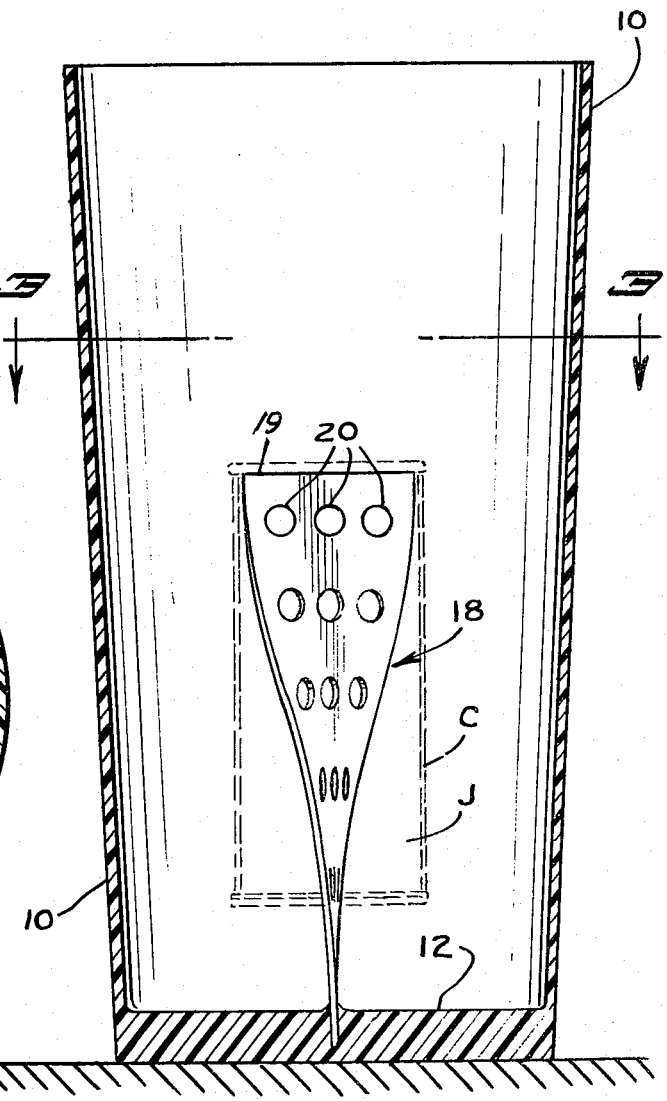
FIG. 2 is a sectional view on the line 2—2 of FIG. 1 with the top removed and a can shown in broken lines with the frozen juice plug thereon impaled upon the blade.
Figure 3:
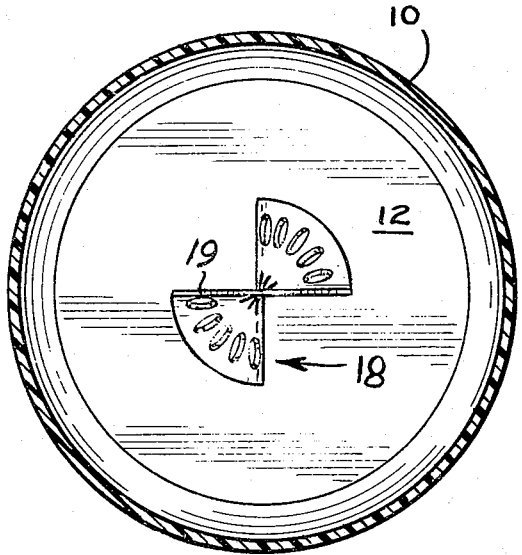
FIG. 3 is a sectional view on the line 3—3 of FIG. 2 with the container and frozen juice removed.

The blade is caused to extend into the frozen contents until it touches the bottom of the can C as in FIG. 2. At this point the user rotates the can C about one half turn in the same direction as previously whereby the outer squared-off end edge 19 of the blade scrapes the inner surface of the end of the can to aid in loosening or freeing the frozen juice at the inner end of the can. Then while still giving the can a twisting movement in the same direction the can is pulled axially until it is free of the juice plug J which remains impaled on the blade. The container C is then discarded and the desired amount of water is added to the receptacle 10 and the spout 17 closed.

The container 10 is then shaken until the frozen juice plug J and the water are thoroughly mixed for serving or storage. In the shaking of the receptacle 10 the blade greatly aids in the mixing of the frozen juice and the water, and lessens the time needed for complete mixing. With the subject device, frozen juice is easily and quickly removed from a container and the same mixed with water in the device with no need for transfer of the juice. Previously the frozen plug of juice had to be dug out or pared out with a spoon or the like or the frozen juice allowed to stand for a period to allow thawing of the juice. With the juice being removed as frozen as above the resultant mixture with water is colder than when the juice is allowed to thaw and then mixed. As a result less ice is needed for a cold juice drink.

The above procedure has been used successfully without the application of heat externally to the juice can for the removal of the juice. The solidity and adhesive properties of the juice plug to the can C may vary under differing freezer temperture and storage conditions. As a result greater effeciency may be gotten by running warm tap water over the can for 2 or 3 seconds before using the device A.

The device A allows easy and positive removal of the frozen juice from a container with immediate mixing of the juice plug with a liquid in the same device.

I claim:

1. A device for removing frozen juice from a container and mixing the same with a liquid in the container comprising in combination:
   a. a walled receptacle having
   b. a bottom,
   c. a rigid blade having a rectangular outline and secured at one end edge to said bottom extending upwardly therefrom within the receptacle and spaced from the top and wall thereof for insertion into the frozen juice of a container to impale the frozen juice on the blade, and
   d. said blade having a helical twist with the free end edge of the blade normal to the longitudinal axis of the blade for engagement with the frozen juice for removal of the juice by withdrawal of the container from the frozen juice impaled upon the blade.

2. The device of claim 1 in which said helical twist is from about 45° to about 90°.

* * * * *